Jan. 10, 1967  F. BUFF ETAL  3,296,658
MANUFACTURE OF EXPANDED CELLULAR PRODUCTS
Filed Dec. 26, 1963  3 Sheets-Sheet 1

INVENTORS
FRED BUFF
MARCUS FRENCH
BY WARREN N. POLLOCK

ATTORNEYS

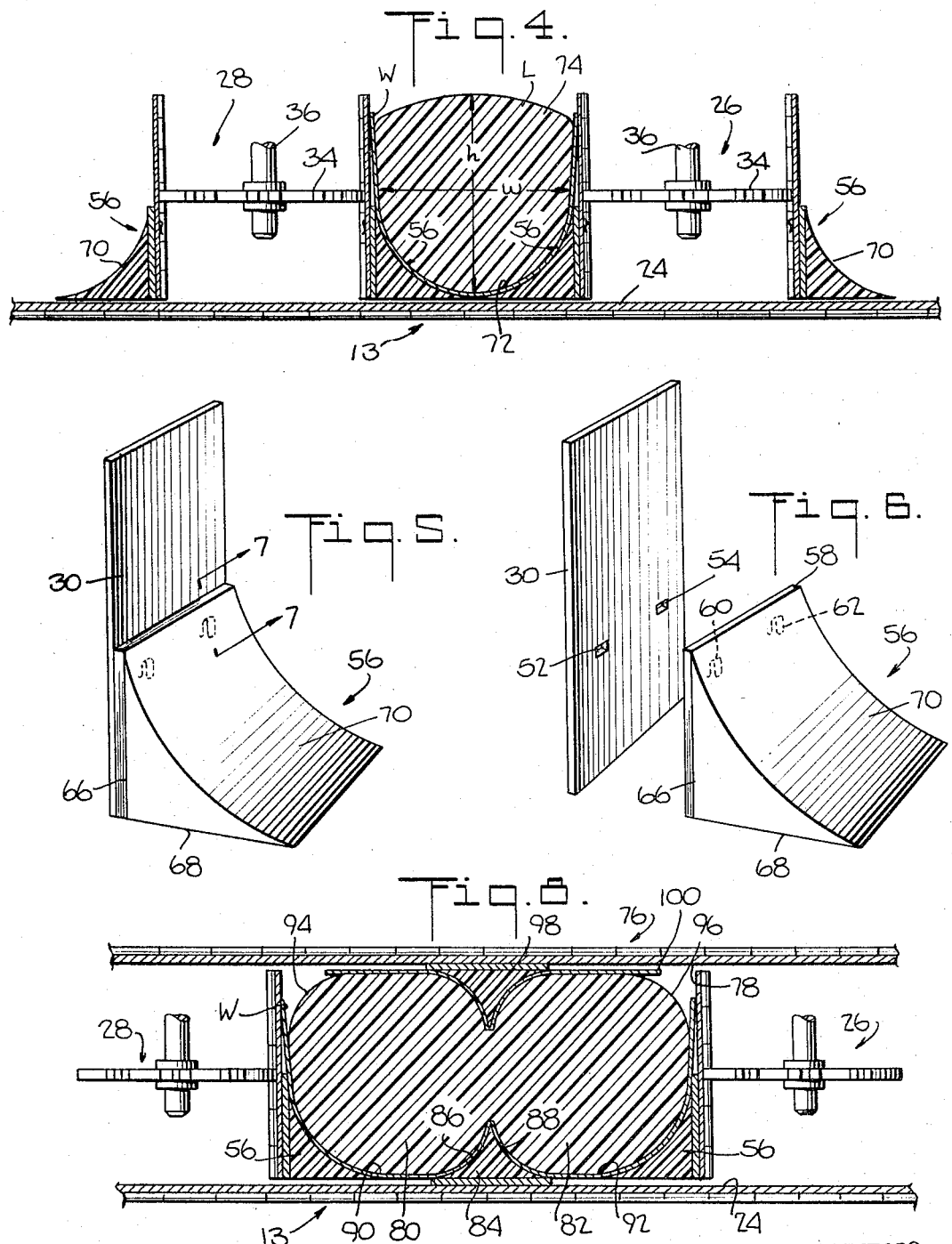

Jan. 10, 1967    F. BUFF ET AL    3,296,658
MANUFACTURE OF EXPANDED CELLULAR PRODUCTS
Filed Dec. 26, 1963    3 Sheets-Sheet 3
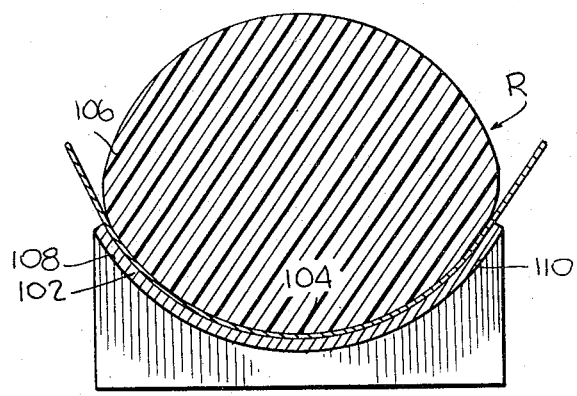
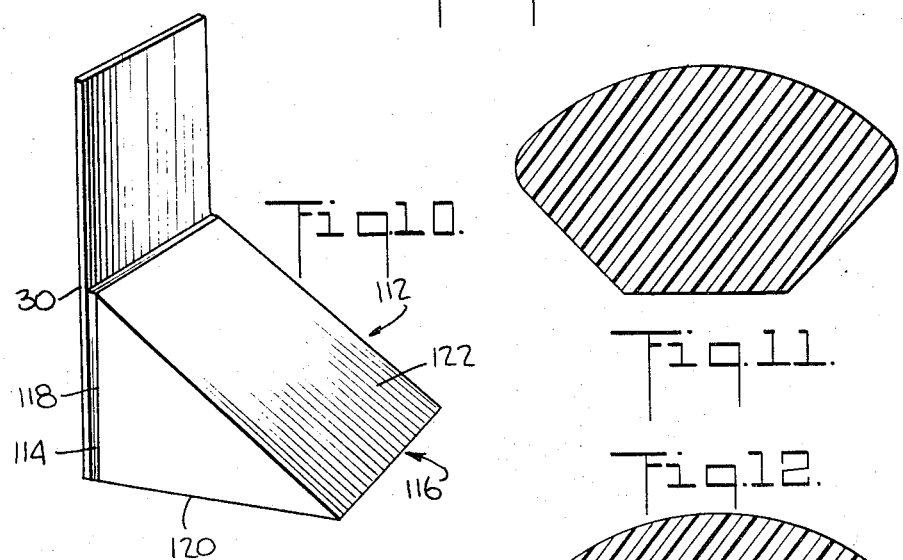
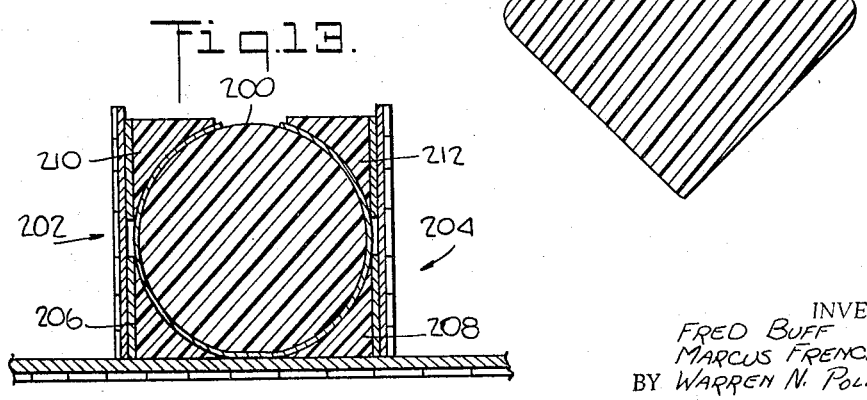
INVENTORS
FRED BUFF
MARCUS FRENCH
BY WARREN N. POLLOCK
ATTORNEYS 3,296,658
MANUFACTURE OF EXPANDED CELLULAR
PRODUCTS
Fred Buff, Paramus, N.J., and Marcus French, Hazleton, and Warren N. Pollock, Conyngham, Pa., assignors to General Foam Corporation, New York, N.Y., a corporation of New York
Filed Dec. 26, 1963, Ser. No. 333,479
6 Claims. (Cl. 18—4)

The present invention relates to the manufacture of expanded cellular products and, more particularly, to novel and improved methods and means for forming continuous, contoured lengths of expanded plastic cellular foam material.

It is the general practice, in the manufacture of expanded cellular products, such as, polyurethane foam, from a liquid reaction mixture, to employ, at a pouring station, a distributing or foaming head or nozzle mounted for travel back and forth across the width of a traveling casting surface. Generally, this casting surface comprises an endless conveyor onto which the liquid reaction mixture is deposited. The mixture reacts and sets in its expanded state as it is supported by and advanced away from the deposit or casting station on the casting conveyor.

As an example, polyurethane foams may be prepared by reaction between polyethers or polyesters having a plurality of hydroxyl groups in the molecule and a diisocyanate, such as, tolylene diisocyanate 4,4'-diphenylmethane diisocyanate. The reaction may be catalyzed by the presence of, for example, a tertiary amine catalyst, such as triethylamine, trimethylamine or N-methylmorpholene. The foams are resilient, cellular structures and are used extensively in the production of many useful products. In many uses, they are favored over other foam materials, such as rubber, because of their improved load bearing capacity as well as abrasion and flame resistance.

The reaction mixture for forming the foam material is cast or deposited as a highly flowable liquid, which readily "runs" or assumes the shape of the surface upon which it is deposited, and starts to foam and rise from the casting surface almost immediately upon moving away from the casting station.

Since the material is highly fluid, most casting conveyors are provided with cooperating side wall elements to form a three-sided, open-top enclosure for the deposited reaction mixture. Heretofore, these cooperating side wall elements have been generally planar and at right angles to the plane of the conveyor. With this arrangement, the cellular product or "slab" or "bun" formed by the reaction mixture has a generally rectangular lower portion. The upper unrestrained top surface of the foam material assumes a natural curved or arcuate configuration—a phenomenon of the reaction forming the product. Inevitably, the products so produced have all exhibited a rectangular lower portion and a curved top surface. This particular configuration has resulted in substantial waste when the relatively-thick slab was subjected to further operations to produce relatively thin sheets which have more commercial application or when shapes other than those having a rectangular bottom were sought.

Generally, the thick slabs as cast are continuous and can be of any given length. Usually the width of the slab may be from 2 to 7 feet, and the slab length up to 9 feet. Obviously, such a massive foam slab must be further handled to produce sizes thereof suitable for commercial application.

To produce these smaller sizes, the slab is "peeled," that is, a longitudinally-extending, axial hole is bored through the slab and a support rod inserted therethrough. The slab is then rotated on its support rod as the slab is brought into contact with a moving cutter element, such as a knife blade, to produce a thinner continuous sheet of foam material from the slab. The rectangular-bottomed slab, when subjected to the peeling operation, results in substantial waste due to its lower, rectangular configuration, which cannot be readily accommodated by the peeling process.

Likewise, when contoured shapes were desired, it was necessary to form these shapes, as by cutting from a large rectangular-bottomed slab. This process again resulted in substantial waste.

The present invention is characterized by the employment of novel method and apparatus for forming a novel, continuous, contoured slab, having a generally circular cross-section. The novel shaped slab is achieved by employing in one form of the invention a pair of spaced vertically-driven side conveyors cooperating in timed synchronism with the lowermost casting conveyor for advancing the foaming reaction products away from the deposit station. To achieve the novel contoured slab, the side conveyors are each provided with a plurality of preferably removable slab support elements. The slab support elements of the opposed conveyors are formed with cooperating contour surfaces. In the preferred embodiment, each contour support element is formed with a support surface that is quarter-cylindrical. Thus, each opposed element forms in contiguous traveling disposition a semi-cylindrical or rounded slab bottom.

By segmentally supporting the foam material on a plurality of contoured support elements, the highly fluid reaction mixture assumes the rounded shape thereof. As the foam material is advanced away from the deposit station, it rises in the conventional manner with the head continuing to deposit reaction materials on the support elements successively delivered by the side conveyors to the deposit station. However, the lowermost portion of the continuously-formed slab in contact with the contoured support elements is formed with a rounded or contoured configuration.

The novel, generally-cylindrical slab shape so produced, when subjected to the peeling process described hereinabove, can be cut into the smaller sheet stock with virtually no waste because of slab shape.

However, in its broadest sense, the novel shaped slab is achieved by employing a casting conveyor having a contoured or shaped section corresponding to the desired shape. The section is adapted to move with the foam from the casting station until the foam slab has at least assumed its final integrity and self-sustaining shape. In this manner, a contoured slab can be readily realized.

Further, by suitably shaping of the casting conveyor or the contour support elements a multitude of slab shapes can be achieved including rounded, cylindrical, trapezoidal or pyramidal foam slabs or buns.

Further objects and advantages of the invention will be obvious herefrom or may be learned by practice with the invention, the same being realized and attained by means of the instrumentalities and combinations pointed out in the appended claims.

The foregoing general description and the following detailed description are exemplary and explanatory, but are not restrictive of the invention.

Of the drawings illustrating by way of example preferred embodiments of the invention, and wherein like numerals designate like parts:

FIG. 4 is a sectional front view taken along line 4—4, FIG. 1;

FIG. 5 is a detailed perspective view of one of the novel contoured slab support elements;

FIG. 6 is an exploded view of the support element of FIG. 5;

FIG. 8 is a sectional front view illustrating a modified form of the present invention;

FIG. 9 is a sectional front view illustrating schematically a second form of the present invention;

FIG. 10 is a detailed perspective view of a modified form of novel contoured slab support elements;

FIGS. 11 and 12 are cross-sectional views of alternative forms of contoured slabs;

FIG. 13 is a sectional front view of another modified form of the present invention.

Figure 1:
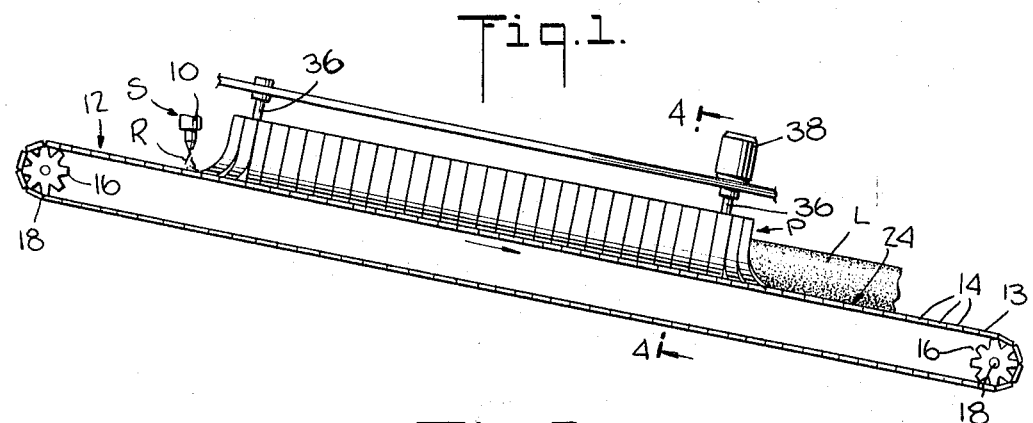
FIG. 1 is a side elevation illustrating somewhat schematically mechanism embodying a form of the present invention.
Figure 2:
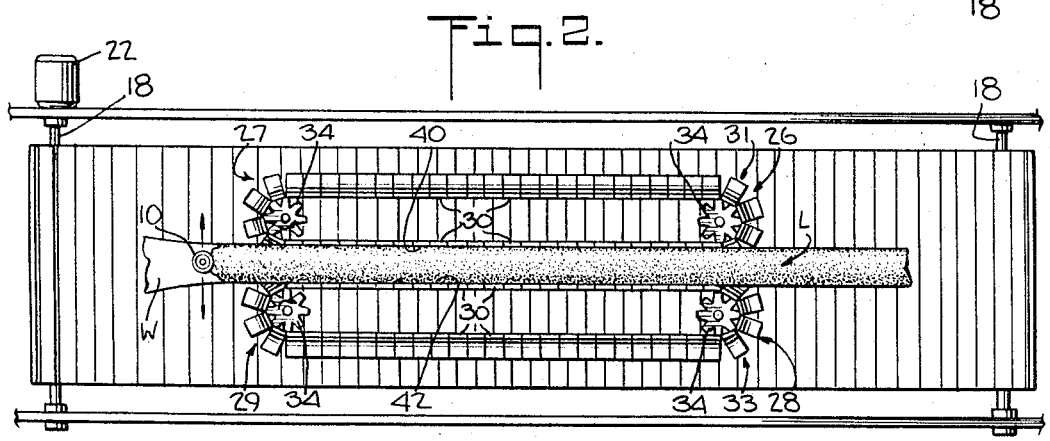
FIG. 2 is a plan view of the mechanism of FIG. 1.
Figure 3:
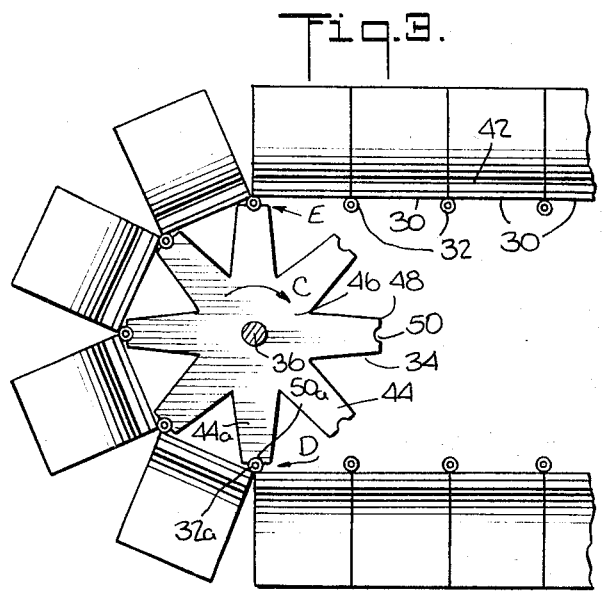
FIG. 3 is a detailed plan view of a portion of the support and drive mechanism of one of the side conveyors of FIG. 1.

Turning to the drawings which illustrate a form of the present invention, and particularly to FIGS. 1–3 the foam reaction liquid R is distributed at the deposit or casting station S from a distributing head, designated generally 10, onto a receiving surface 12. Head 10 is mounted for reciprocal travel in the direction of the arrows, FIG. 2, transverse to the direction of travel of surface 12 to provide uniform distribution of the reaction liquid R onto surface 12.

Surface 12 is preferably part of an endless conveyor 13 formed of a plurality of pivotally-interconnected metallic bars 14. In the form of conveyor 12, illustrated schematically in FIG. 1, the ends of the conveyor 13 are trained around spaced spiders 16. The spiders 16 are shown fixed to and rotatable with associated axial support shafts 18, in turn, supported in suitable bearing on framework 20 and driven by motor 22. As shown in FIG. 1, the conveyor support elements can be vertically spaced as well as horizontally to provide a readily variable slight downward grade or incline to the conveyor in its direction of travel, arrow A, FIG. 1, past station S. Thus, conveyor 13 is mounted for travel to and away from station S for deposit of liquid R onto its uppermost stretch 24 passing directly beneath head 10 in the direction of arrow A.

It will be understood that other forms of conveyor 13 or its drive mechanism may be employed without adverse effect.

Cooperating with conveyor 13 to contain the foam material therebetween are a pair of spaced side endless conveyors 26 and 28. Each of the side conveyors 26 and 28 is also formed with a plurality of contiguous metallic bars 30. Adjacent bars 30, in turn, are each pivotally connected to an intermediate rod 32 (see FIG. 3). The conveyors 26 and 28 are trained at each end about associated spiders 34, each of which is supported on and rotatable with a related axial shaft 36. One of the shafts 36 for each conveyor is connected to a suitable power source, such as motor 38, and both the motors 38 and shafts 36 are suitably mounted on a portion of the machine framework 20.

In operation, conveyors 26 and 28 are mounted for relative movement toward or away from each other to vary, as desired, the foam slab width. Likewise, one end 27 and 29, respectively, of conveyors 26 and 28 is located adjacent the deposit station S while the other end 31 and 33 of conveyors 26 and 28, respectively, are located at a point P along the path of travel of conveyor 13 remote from station S. At point P the foam reaction has been completed, and the slab L thus formed has assumed its final integrity and self-sustaining shape and, accordingly, is released by side conveyors 26 and 28.

To travel conveyors 26 and 28 back and forth between deposit station S and release point or station P, conveyors 26 and 28 are trained about spiders 34 as described hereinabove which, when connected to their driving source, rotate in their respective directions shown by the arrows thereon in FIG. 2, to travel laps 40 and 42 of conveyors 26 and 28 in opposed, foam slab-supporting arrangement from station D to station P.

Spiders 34 are formed with a plurality of arms 44 extending radially outwardly from a central section 46. The tip 48 of each arm 44 is provided with a recess 50 therein which accommodates a rod 32 supporting two adjacent bars 30. As shown best in FIG. 3, spider 34, which shows the end 29 of conveyor 28 by way of example, is rotated, as in the direction of arrow C, FIG. 3, such that an arm 44a thereof engages an associated rod 32a at point D in its end recess 50a. As spider 34 is rotated from its power source (not shown), rod 32a travels in its spider arm 44a to point E where it is released by this particular spider 34 for travel along lap or stretch 42 in slab-supporting disposition.

It will be understood that, if desired, conveyor 13 may be supported and driven in similar fashion or other forms of support and drive for conveyors 13, 26 and 28 may be readily employed without adverse effect.

Preferably, conveyors 13, 26 and 28 are driven by their respective drive systems in timed synchronism at exactly the same speed. Thus, during the foam rise between stations D and P, no highly undesirable external stress is developed by slab L from misalignment or jarring, as would occur if there were a speed differential transverse across the slab cross-section.

Suitable apparatus, including support and drive mechanism for conveyors 13, 26 and 28, except as herein modified below, is commercially available from M–H Standard Corporation, 400 Heaton Street, Hamilton, Ohio, and further disclosure thereof is omitted in the interests of brevity.

Figure 7:
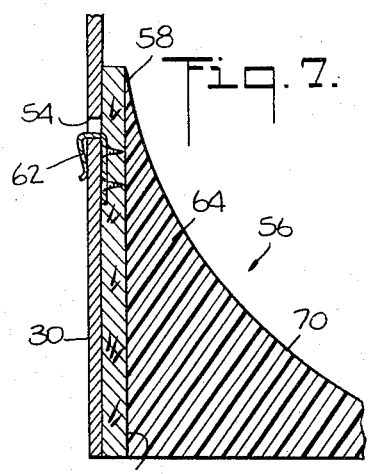
FIG. 7 is a sectional view of the support element taken along line 7—7, FIG. 5.

To achieve the novel contoured slab which preferably is formed as a continuous, generally cylindrical body, the bars 30 of each conveyor 26 and 28 have formed therein a pair of spaced slots 52 and 54, which releasably accommodate a contoured slab-support element 56 (see FIGS. 5–7).

Element 56 includes a rigid base member 58 of wood, plastic, metal or other suitable rigid material into which are fixed a pair of spring-like retaining slips 60 and 62. Clips 60 and 62 are accommodated in slots 52 and 54, respectively, as shown best in FIG. 7, to releasably connect support element 56 and its associated travel bar 30 with base 58 of the support element 56 contiguous to its bar 30.

Element 56 also includes a three-sided, wedge-shaped contour piece 64, having a pair of transverse legs 66 and 68 and an arcuate third side or face 70. Contour piece 64 is adhered or otherwise suitably attached to base 58 along leg 66 with leg 68 thereof positioned closely adjacent or in contact with the upper stretch 24 of conveyor 13 (see FIG. 4). Thus, arcuate face 70 is the slab-supporting portion of contour piece 65. As will be noted, face 70 is preferably quarter-cylindrical and when in operative slab-supporting position shown in FIG. 4, opposed elements 56 have cooperating faces 70 to form a continuous, semi-cylindrical bottom support for the slab L being formed.

It has been found that a highly suitable material for wedge-shaped piece 64 is flexible urethane foam, which can be quickly and inexpensively contoured to the desired shape and, in addition, has the capacity to absorb any detrimental jarring that will occur to the slab L as it is in the process of being formed by the reaction materials. However, other materials, such as wood or a rigid polystyrene foam and toher fabricated or cast products of various kinds could also be employed for this purpose.

In operation, the preferred relative spacing of conveyors 26 and 28 is made by the machine operator, and the desired angle of inclination of conveyor 13 is set. Contour pieces 64 with the proper contour faces 70 are attached to their associated conveyors 26 and 28 and the speeds of conveyors 13, 26 and 28 synchronized.

Next, a web of highly non-adhering release paper W is fed past the deposit station D between laps 40 and 42 of conveyors 26 and 28, and onto the cooperating contour faces 70 of the opposed pieces 64.

Release paper W is utilized to prevent adhesion of the foam material, due to its elastomeric nature, to the surfaces of the conveyors. While a silicon or polyfluoroethylene coating of the portions of the conveyors in contact with the foam material might suffice, it has been found that release paper operates the most satisfactorily for this purpose. It will, of course, be understood that the release paper W also assumes the rounded shape of contour pieces 70 (see FIG. 4).

With the conveyors 13, 26 and 28 properly set and running, and release paper W in place thereon, distributing head 10 is started on its reciprocating travel to deposit liquid reaction material R onto the release paper W and the cooperating faces 70 of the side conveyors 26 and 28, which conduct the now-foaming reaction material away from deposit station D.

When the reaction has been completed and the slab L assumes its integral size upon completion of the foam reaction, the supporting contour elements 56 are moved out of supporting position around their associated spiders 34 at release station P and the formed slab L on conveyor 13 continues its travel to a suitable cutting station (not shown) and thence to a remote peeling station (not shown).

As shown best in FIG. 4, the novel slab shape achieved by the present invention comprises a rounded or contoured lowermost or bottom section 72. The uppermost surface 74, which was unrestrained during the foam reaction, assumes the rounded shape characteristic of the top portion of the foam slab. Thus, the novel shape of slab L of the present invention is generally of a cylindrical shape with a generally circular cross-section. As noted in FIG. 4, the slab shape is not a true geometric cylinder. However, the illustrated preferred shape thereof most nearly resembles a cylinder in appearance. It will be understood, though, that by suitably shaping contour pieces 56 other desired shapes can be achieved. However, it has been found preferably to shape contour pieces 56 and space conveyors 26 and 28 so as to achieve a slab having approximately the same width $w$ as height $h$, the length of the slab being of any desired length to facilitate subsequent handling and manufacture.

FIG. 8 illustrates an alternate form of the invention. In this arrangement, there is provided a fourth conveyor similar in construction and operation to conveyor 13. Conveyor 76 has a lap 78 thereof in opposed, spaced, parallel disposition to lap 24 of conveyor 13, such that laps 24, 40, 42 and 78 form a complete four-sided enclosure for the slab. In this embodiment, a plurality of generally cylindrical slabs 80 and 82 are formed.

To form the slabs 80 and 82, conveyor 13 is provided with a central peaked slab support element 84. Element 84 has a pair of arcuate faces 86 and 88, each cooperating with an opposed face 70 of side conveyors 26 and 28, respectively, to form the rounded bottom portions 90 and 92 of slabs 80 and 82.

To form the rounded top surfaces 94 and 96 of slabs 80 and 82, respectively, top conveyor 76 is also provided with a central peaked element 98 downwardly depending therefrom in opposed, spaced relation to element 84, thereby defining slabs 80 and 82. It will be understood that, without conveyor 76 and peaked element 98, there would be formed a common arcuate top surface for both slabs 80 and 82. However, with the top conveyor 76 and peaked element 98, two generally cylindrical, interconnected foam slabs 80 and 82 are formed.

In operation, the foam reaction mixture is deposited onto conveyor 13 and release paper W, as described heretofore for the first embodiment. However, the top conveyor 76 with release paper 100 also placed thereagainst restrains the top portion of the slabs 80 and 82, thus defining their top surfaces 94 and 96 to form slabs of generally cylindrical shape.

If desried, any number of interconnected slabs may be thus formed by increasing the number of cooperating peaked elements on conveyors 13 and 76.

Thus, there is described novel and improved methods and apparatus for continuously forming a novel plastic foam slab having a generally cylindrical configuration. The novel slab thus formed virtually eliminates all waste and can be readily cut into the thinner, more commercially desired sizes without, as heretofore, substantial loss of slab material.

Turning to FIG. 9, there is illustrated an alternative form of the invention. In this form of the invention, the foam reaction liquid R is distributed onto a moving conveyor 102 which may be similar in construction to conveyor 13 of the previously described form of the invention.

As heretofore conveyor 102 has a layer of release paper 104 thereon. Side conveyors 26 and 28 have been eliminated in this embodiment.

To achieve the contoured slab 106 the sides of conveyor 102 are curved as by movement over arcuate cam surfaces 108, 110 extending from the deposit station preferably to the release station.

In operation, the liquid R is deposited onto the curved conveyor 102 at the deposit station, and the foaming reaction material is conducted away from the deposit station.

When the reaction has been completed and the slab assumes its integral size upon completion of the foam reaction, achieving the shape shown in cross-section in FIG. 9, conveyor 102 may if desired move off cam surfaces 108, 110. However, it will be understood that surfaces 108, 110 can if desired run the full length of the conveyor stitch. Also other means may be employed for suitably shaping the conveyor 102 during its travel from the deposit station to the release station.

FIG. 10 illustrates an alternate form of contoured slab-support element 112. Element 112 is preferably wedge-shaped comprising a rigid base member 114 adapted to releasably connect element 112 onto its associated travel bar 30.

Element 112 also includes a three-sided, pyramidal contour member 116 which may be of similar material to member 56 having three generally planar faces 118, 120, 112. When in operative slab-supporting position, opposed elements 112 have cooperating faces 122 to form a continuous slab with angular related bottom faces such as shown in FIG. 11 and FIG. 12. FIG. 12 illustrates a form of slab formed when elements 116 and faces 122 are contiguous and FIG. 11 illustrates a form of slab achieved when elements 116 and faces 122 are spaced.

Referring to FIG. 13, there is illustrated still another form of the invention wherein there is achived a substantially totally-contoured slab 200. To achieve a totally-contoured slab 200, there is provided side conveyors 202 and 204 similar in construction and operation to side conveyors 26 and 28 of the first-described embodiment. Conveyor 202 and 204 are each provided with a plurality of lower support elements 206 and 208 respectively which are likewise similar in construction and operation to element 56 of the first-described mechanism. In addition, conveyors 202 and 204 are also provided with a plurality of upper support elements 210 and 212 respectively which cooperate with elements 206 and 208 respectively to substantially totally-enclose the foaming product, thereby directing its ultimate shape into the desired contour. As shown in FIG. 13, slab 200 is substantially cylindrical. However, by suitably shaping elements 206, 208, 210 and 212 other desired shapes can be achieved in like manner.

Although certain particular embodiments of the invention are herein disclosed for purposes of explanation, further modifications thereof, after study of the specification, will be apparent to those skilled in the art to which the invention pertains. Reference should accordingly be had to the appended claims in determining the scope of the invention.

What is claimed and desired to be secured by Letters Patent is:

1. Apparatus for the production of molded free-rise polyurethane foamed articles from a liquid reaction mixture, said apparatus comprising a laterally extending conveyor means, said conveyor means including means defining a substantially flat moving surface which moves along a given path and further including means along said path for gradually changing said moving surface from flat to rounded contour in such a manner that the width of the flat portion of said surface becomes narrower by virtue of the formation of arcuate side surfaces on either side thereof, a mixture deposit station located above said flat moving surface, and means at said deposit station for depositing a polyurethane foamed forming liquid reaction mixture uniformly onto said flat moving surface changes from flat to rounded contour.

2. Apparatus as in claim 1 wherein said rounded contour continues along said path beyond the location at which a polyurethane forming reaction mixture deposited on said surface at said deposit station substantially completes its rise reaction.

3. Apparatus as in claim 1 wherein said given path slopes downwardly away from said deposit station.

4. Apparatus as in claim 1 further including a release station along said path at a distance downstream of said deposit station beyond the point at which a reacting polyurethane mixture completes its rise reaction.

5. Apparatus as in claim 1 wherein said moving surface along both its flat and contoured portions comprises a web of sheet material which moves along said path and support elements which move along under said sheet material forming it into its stated contours.

6. Apparatus as in claim 5 wherein said sheet material comprises release paper.

References Cited by the Examiner

UNITED STATES PATENTS

| | | | |
|---|---|---|---|
| 2,141,405 | 12/1938 | Randall | 18—4 |
| 2,456,922 | 12/1948 | Cogovan | 161—36 |
| 2,817,875 | 12/1957 | Harris et al. | 18—4 |
| 2,835,924 | 5/1958 | Schmeling | 18—4 X |
| 2,929,793 | 3/1960 | Hirsh | 18—4 X |
| 2,931,063 | 4/1960 | Harris | 18—4 X |
| 3,076,226 | 2/1963 | Borton et al. | 18—4 |
| 3,080,613 | 3/1963 | Wall et al. | 264—54 |
| 3,123,856 | 3/1964 | Dye et al. | 18—4 |
| 3,131,426 | 5/1964 | Legler | 18—5 |
| 3,152,361 | 10/1964 | Edwards | 18—4 |
| 3,214,793 | 11/1965 | Vidol | 18—4 |

WILLIAM J. STEPHENSON, *Primary Examiner.*

MORRIS SUSSMAN, J. SPENCER OVERHOLSER,
*Examiners.*